US012772162B2

(12) United States Patent
Yang et al.

(10) Patent No.: US 12,772,162 B2
(45) Date of Patent: Oct. 20, 2026

(54) SYSTEMS AND METHODS FOR RADIO ACCESS NETWORK ROUTING BASED ON TRAFFIC ATTRIBUTES

(71) Applicant: Verizon Patent and Licensing Inc., Basking Ridge, NJ (US)

(72) Inventors: Jin Yang, Orinda, CA (US); Thomas W. Haynes, Clayton, CA (US); Samita Chakrabarti, Bedminster, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 292 days.

(21) Appl. No.: 18/424,627

(22) Filed: Jan. 26, 2024

(65) Prior Publication Data

US 2025/0247780 A1 Jul. 31, 2025

(51) Int. Cl.

*H04W 48/20* (2009.01)
*H04M 15/00* (2024.01)
*H04W 28/02* (2009.01)

(52) U.S. Cl.

CPC .......... *H04W 48/20* (2013.01); *H04M 15/66* (2013.01); *H04W 28/0268* (2013.01)

(58) Field of Classification Search

CPC .. H04W 48/20; H04W 28/0268; H04M 15/66
See application file for complete search history.

(56) References Cited

U.S. PATENT DOCUMENTS 11,197,200 B2 * 12/2021 Yang .................... H04L 47/283
2024/0323086 A1 * 9/2024 Rajendran ............ H04W 24/02

FOREIGN PATENT DOCUMENTS

WO WO-2023164617 A1 * 8/2023 ........... H04W 28/08

* cited by examiner

*Primary Examiner* — Brandon J Miller

(57) ABSTRACT

A system described herein may receive traffic from a User Equipment ("UE") via a radio unit ("RU"), may identify one or more attributes of the traffic, and may select a first Central Unit ("CU"), from a group of CUs that includes the first CU and a second CU, based on the one or more attributes of the traffic. The one or more attributes may include a network slice. The device may further route the traffic to the selected first CU, wherein the CU aggregates received traffic and routes the aggregated traffic to a user plane gateway. The device may include a Distributed Unit ("DU") of a radio access network ("RAN") that includes the first and second CUs. The first and second CUs may include a first CU-User Plane ("CU-UP") and a second CU-UP. The DU and the CUs may be configured by a CU-Control Plane ("CU-CP") of the RAN.

20 Claims, 11 Drawing Sheets

SYSTEMS AND METHODS FOR RADIO ACCESS NETWORK ROUTING BASED ON TRAFFIC ATTRIBUTES

BACKGROUND

Wireless networks provide wireless connectivity to User Equipment ("UEs"), such as mobile telephones, tablets, Internet of Things ("IoT") devices, Machine-to-Machine ("M2M") devices, or the like. UEs may send or receive traffic via wireless networks in order to receive services such as content streaming services, device control services (e.g., control of manufacturing robots, automated guided vehicles ("AGVs"), semi-autonomous cars, etc.), videoconferencing services, or the like. Different services may have different sensitivities or requirements with respect to latency, jitter, or other traffic performance metrics.

DETAILED DESCRIPTION OF EXAMPLE EMBODIMENTS

The following detailed description refers to the accompanying drawings. The same reference numbers in different drawings may identify the same or similar elements.

Embodiments described herein provide for a RAN architecture that provides selective routing based on traffic attributes, such as Service Level Agreements ("SLAs"), Quality of Service ("QoS") parameters, network slice, latency thresholds, service types or categories (e.g., AGV control services, "mission critical" services, etc.), or other suitable attributes. As discussed herein, an element of the RAN that is responsible for processing and forwarding lower layer communications (e.g., physical ("PHY"), Media Access Control ("MAC"), and/or Radio Link Control ("RLC") layers), such as a Distributed Unit ("DU"), may selectively forward traffic toward its intended destination (e.g., to an application server or other suitable device or system) via different routes, paths, etc. based on attributes of the traffic. The RAN may include a functional split between the DU (e.g., which processes lower layers of traffic) and one or more Central Units ("CUs"), which process traffic at higher layers (e.g., a Packet Data Convergence Protocol ("PDCP") layer, a Service Data Application Protocol ("SDAP") layer, etc.). In accordance with embodiments described herein, a DU may selectively route traffic to different CUs based on attributes of the traffic such as latency sensitivity, network slice, service type, or the like. In this manner, latency-sensitive traffic may be processed more quickly, as some CUs may be deployed relatively closer to respective DUs (e.g., geographically closer, with fewer routing "hops" or links, etc.) and may be able to receive and process traffic faster than other CUs that are deployed relatively farther from such DUs. In this manner, services that are extremely sensitive to latency, such as AGV control services, mission-critical voice or video services, low-latency utility services such as Direct Transfer Trip ("DTT") services, etc. may be provided by a wireless network with the same or better performance and reliability as compared to wired networks.

Figure 1:
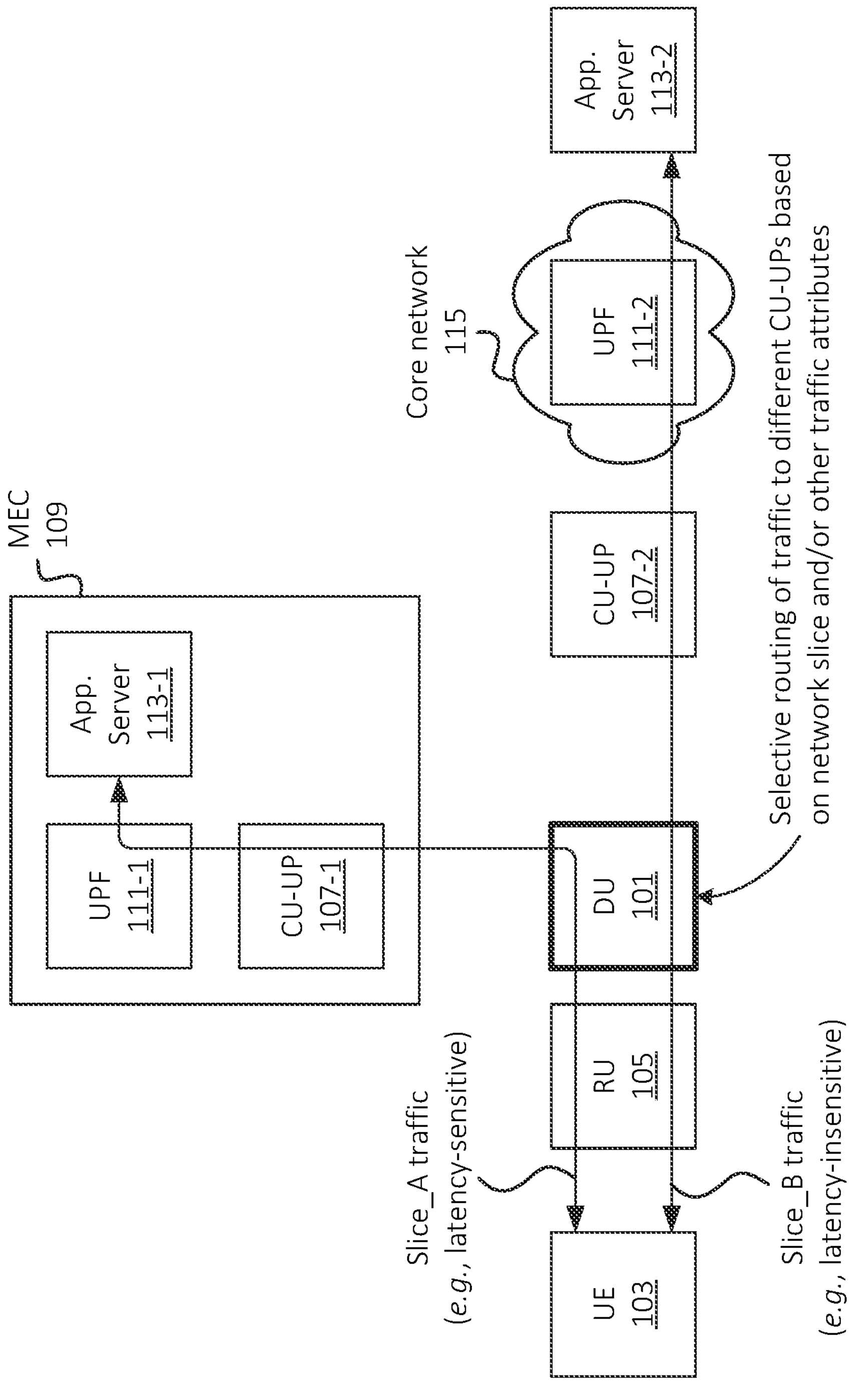
FIG. 1 illustrates an example overview of one or more embodiments described herein.

As shown in FIG. 1, a particular DU 101 may wirelessly communicate with one or more UEs 103 via radio unit ("RU") 105. RU 105 may, for example, serve as a wireless interface between DU 101 and UE 103, such as by wirelessly sending and receiving data (e.g., at the PHY layer) between DU 101 and UE 103. In the uplink direction (e.g., traffic received from UE 103 via RU 105), DU 101 may perform aggregation and/or processing on such traffic in order to generate RLC packets for forwarding to a given CU-User Plane ("CU-UP"), which may perform further aggregation and/or processing in order to generate higher layer traffic such as PDCP packets and which may further route the traffic (e.g., based on the generated PDCP packets) toward its intended destination.

In accordance with some embodiments, various CU-UPs 107 may be deployed in the wireless network, where different CU-UPs 107 are selected to handle traffic with different attributes. As shown, for example, DU 101 may selectively route traffic associated with different network slices, and/or other suitable attributes that are able to be identified by DU 101, to different CU-UPs 107. DU 101 may, for example, route traffic (e.g., uplink traffic) associated with a first network slice (shown as "Slice_A") to a first CU-UP 107-1, and may route traffic associated with a second network slice (shown as "Slice_B") to a second CU-UP 107-2. In this example, assume that Slice_A is associated with latency-sensitive traffic, such as AGV control traffic, DTT traffic, mission-critical voice or video traffic, or the like. Further assume that Slice_B is associated with latency-insensitive traffic, or traffic that is otherwise less latency-sensitive than traffic associated with Slice_A.

In accordance with some embodiments, CU-UP 107-1 may be deployed in closer geographical proximity to DU 101, may be implemented by the same set of hardware resources as DU 101, may be connected to DU 101 via higher speed links than CU-UP 107-2, etc. In other words, communications between DU 101 and CU-UP 107-1 may be faster (e.g., delivered with lower latency) than communications between DU 101 and CU-UP 107-2. As shown, for example, CU-UP 107-1 may be implemented by an edge computing device, such as Multi-Access/Mobile Edge Computing ("MEC") device 109, referred to sometimes herein simply as a "MEC" 109. On the other hand, CU-UP 107-2 may be deployed at a "far edge," at a cloud computing system, and/or may otherwise exhibit higher latency of communications with DU 101 than CU-UP 107-1.

Traffic routed (by DU 101) to CU-UP 107-1, such as Slice_A traffic, may thus be received by CU-UP 107-1 with lower latency than traffic routed to CU-UP 107-2, such as Slice_B traffic. CU-UP 107-1 may accordingly process and forward the received Slice_A traffic, such as to UPF 111-1 to which CU-UP 107-1 is communicatively coupled. For example, UPF 111-1 may be co-located with and/or may be located geographically proximate to CU-UP 107-1. In some embodiments, UPF 111-1 and CU-UP 107-1 may be implemented by the same set of hardware resources, such as by the same particular MEC 109. UPF 111-1 may perform higher layer processing and/or routing, such as routing the traffic based on Internet Protocol ("IP") addresses included in header information of the traffic. In this example, the intended destination of the Slice_A traffic may be application server 113-1. In accordance with some embodiments, application server 113-1 may be implemented by the same set of hardware resources as UPF 111-1 and/or CU-UP 107-1 (e.g., MEC 109). In this manner, some or all of the baseband processing of wireless traffic received from UE 103 (e.g., the processing of PHY traffic to higher layers, such as PDCP traffic) may be performed by hardware resources that are co-located with or are relatively proximate to UE 103, thus minimizing the end-to-end latency of such traffic (e.g., minimizing the time of delivery of the traffic from UE 103 to application server 113-1).

In scenarios where milliseconds are critical, performing the baseband processing (e.g., by CU-UP 107-1) in an expeditious manner may ultimately improve the performance and reliability of services that require or otherwise benefit from low latency delivery of traffic. Additionally, performing baseband processing of such traffic at the same hardware resources as an ultimate destination of the traffic (e.g., the same MEC 109 that is used to implement application server 113-1) may also conserve network resources that would otherwise be used to send the traffic to a non-local CU-UP (e.g., CU-UP 107-2) via network links such as cables, fibers, etc.

Further, selectively processing some traffic (e.g., latency-sensitive traffic) at CU-UP 107-1 while processing other traffic at CU-UP 107-2 may serve to avoid overloading or otherwise needing to increase the traffic handling capabilities of CU-UP 107-1. That is, the latency or other performance metrics provided via forwarding traffic to CU-UP 107-1 may greatly exceed SLAs or QoS parameters of certain traffic, and may thus be an inefficient use of resources for such traffic. Further, MEC 109 and/or CU-UP 107-1 may be more "lightweight" than CU-UP 107-2 (e.g., which may be deployed via a cloud-based system or more intensive hardware than MEC 109), and may thus be more feasible to deploy at local sites. Limiting the forwarding of traffic, to CU-UP 107-1, to only traffic that is associated with particular network slices or other suitable attributes may serve as a load-balancing mechanism in accordance with the capabilities of the hardware resources of MEC 109 (and/or of other suitable hardware that is used to implement CU-UP 107-1).

As further shown, for example, DU 101 may route traffic, received from UE 103 and associated with Slice_B, to CU-UP 107-2 instead of to CU-UP 107-1. As noted above, CU-UP 107-2 may be deployed at a "far cloud" or other hardware resources (e.g., which may be less proximate to DU 101 than CU-UP 107-1 and/or MEC 109, may be capable of handling more traffic than CU-UP and/or MEC 109, etc.). In some embodiments, CU-UP 107-2 may be communicatively coupled to core network 115, which may provide connectivity to one or more other networks such as the Internet. Core network 115 may also include one or more UPFs, such as UPF 111-2, which may also provide routing services as similarly noted above with respect to UPF 111-1. UPF 111-2 may forward such traffic toward its intended destination (e.g., application server 113-2) via one or more other networks such as the Internet.

Figure 2:
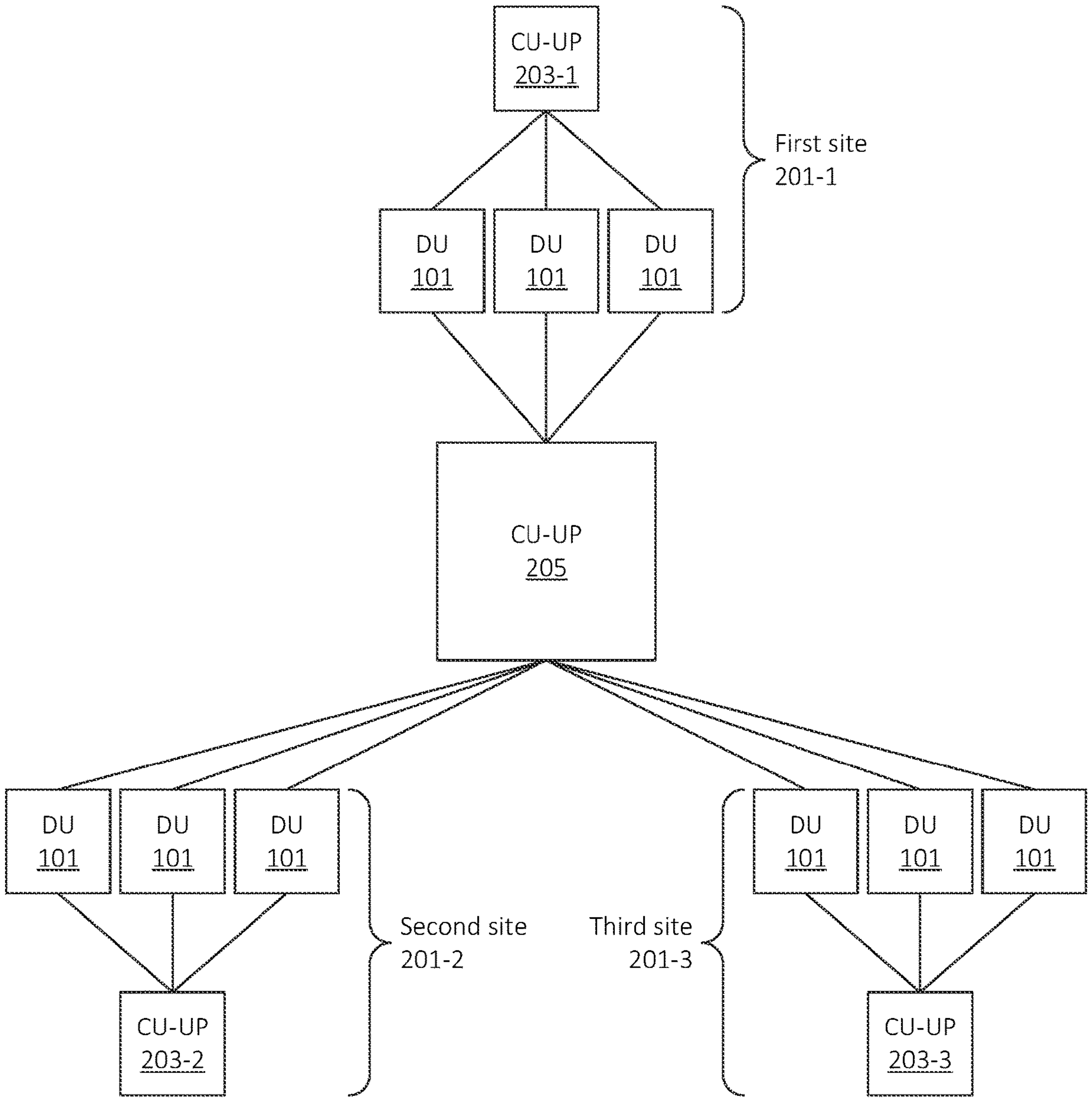
FIGS. 2-4 illustrate example arrangements of wireless network elements, in accordance with some embodiments.

FIG. 2 illustrates an example arrangement of various DUs and CU-UPs in accordance with some embodiments. In this example, three "sites" 201 are shown, where a given site 201 may refer to a building, a facility, an electrical substation, a campus, a city block, or other suitable type of geographical region. Each site 201 may include a respective set of DUs 101 (where each DU 101 may be associated with a respective RU 105) and a respective local CU-UP 203. For example, as shown, site 201-1 may be associated with a first set of DUs 101 and a first local CU-UP 203-1, site 201-2 may be associated with a second set of DUs 101 and a second local CU-UP 203-2, and site 201-3 may be associated with a third set of DUs 101 and a third local CU-UP 203-3. As noted above, each respective local CU-UP 203 may be "local" to a site inasmuch as such CU-UPs 203 are implemented by MECs 109 or other suitable hardware that is communicatively coupled to respective DUs 101 (e.g., DUs 101 of the first site 201-1 and CU-UP 203-1 may be implemented by the same MEC 109 or other suitable set of hardware resources).

In accordance with some embodiments, some or all DUs 101 (e.g., DUs 101 of multiple different sites 201) may also be communicatively coupled to CU-UP 205. CU-UP 205 may be implemented by a set of hardware resources that is "remote" or "non-local" with respect to sites 201-1, 201-2, and/or 201-3. For example, CU-UP 205 may be implemented by a cloud computing system, a set of server devices, etc. that are separate from DUs 101 and/or CUs 203.

In accordance with some embodiments, DUs 101 may be configured to route certain traffic to local CU-UPs 203, while DUs 101 may be configured to route other traffic to CU-UP 205. For example, as similarly noted above, DUs 101 of site 201-1 may route traffic (e.g., uplink traffic received via an associated RU 105) that is associated with a first set of attributes (e.g., traffic with a particular network slice indicator or marking, traffic from a particular UE 103, and/or traffic with other identifiable attributes) to CU-UP 203-1, and may route traffic associated with a second set of attributes to CU-UP 205. As noted above, the selective routing may help avoid congesting or overloading CU-UP 203-1 with latency-insensitive traffic, while gaining the improved latency or other performance metrics exhibited via CU-UP 203-1 for latency-sensitive traffic.

Figure 3:
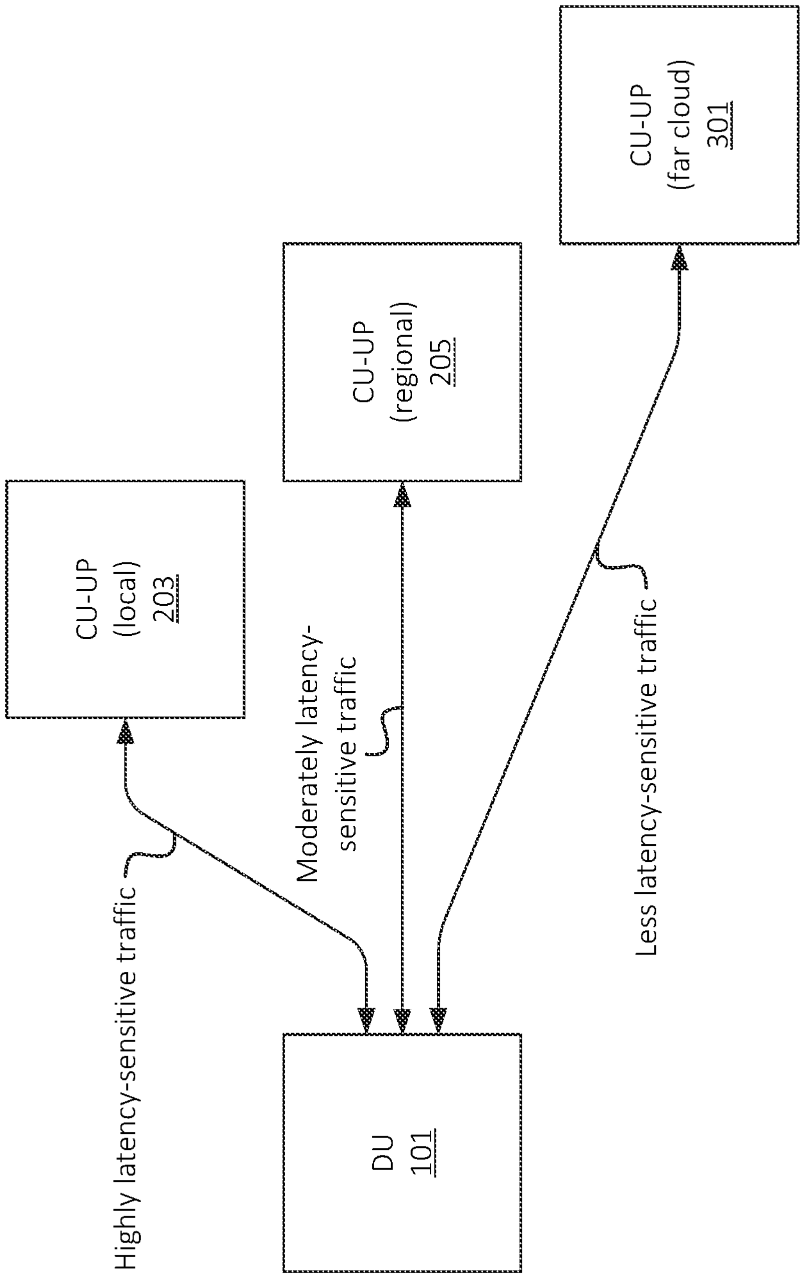

Although two levels of CU-UP are shown in FIG. 2 (e.g., local CU-UPs 203 as well as CU-UP 205), in practice three or more levels of CU-UP may be deployed in accordance with some embodiments. For example, as shown in FIG. 3, DU 101 may be communicatively coupled to local CU-UP 203 (e.g., which may be implemented by the same set of hardware resources as DU 101 and/or may otherwise be connected to DU 101 via a low-latency connection or other suitable communication pathway), regional CU-UP 205, and "far cloud" CU-UP 301.

Generally, DU 101 may be configured to route highly latency-sensitive traffic to local CU-UP 203, moderately latency-sensitive traffic to regional CU-UP 205, and less latency-sensitive traffic to far cloud CU-UP 301. While latency sensitivity is discussed here as an example of criteria that DU 101 may use to selectively route traffic to local CU-UP 203, regional CU-UP 205, or far cloud CU-UP 301, in practice other parameters or criteria may be used in addition to or in lieu of the latency sensitivity of the traffic. As discussed below, DU 101 may be dynamically configured by a RAN controller (e.g., a CU-Control Plane ("CU-CP")) to selectively route traffic based on particular criteria or parameters.

Figure 4:
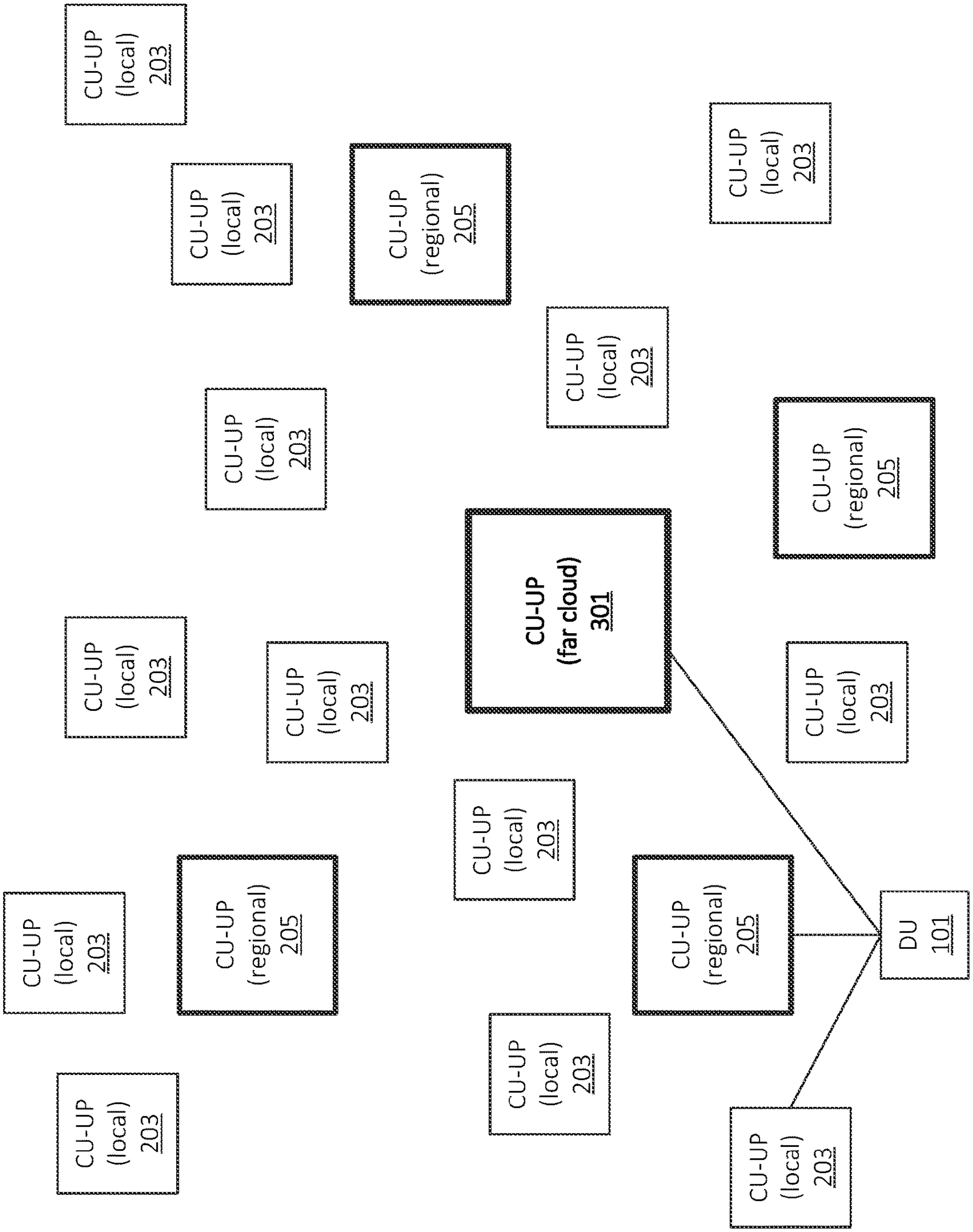

FIG. 4 illustrates an example arrangement of different levels of CU-UPs in a particular geographical area (e.g., a country, a state, a province, etc.). In this example, relatively more local CU-UPs 203 may be deployed than regional CU-UPs 205, and more regional CU-UPs 205 may be deployed than far cloud CU-UPs 301. As discussed above, a given local CU-UP 203 may provide lower latency services to a given DU 101 than a regional CU-UP 205, and a given regional CU-UP 205 may provide lower latency services to such DU 101 than far cloud CU-UP 301. On the other hand, far cloud CU-UP 301 may be more scalable, more capable of handling large amounts of traffic, etc. than local CU-UPs 203 and/or regional CU-UPs 205.

Further, in situations where a particular CU-UP becomes unreachable, unavailable, etc., DU 101 may be assigned (e.g., by a RAN controller such as a CU-CP) to communicate with a different CU-UP. For example, if a particular regional CU-UP 205, with which DU 101 is assigned to communicate, becomes non-operational or unavailable, the RAN controller may assign DU 101 to instead communicate with a different regional CU-UP 205 which may satisfy the same SLAs or QoS parameters (or which may otherwise provide the best available performance) as the previously assigned regional CU-UP 205.

In this example, a particular DU 101 is assigned to communicate with one local CU-UP 203, one regional CU-UP 205, and one far cloud CU-UP 301. In practice, DU 101 may be assigned to communicate with multiple local CU-UPs 203, multiple regional CU-UPs 205, etc. For example, DU 101 may be configured to route traffic, associated with one particular network slice or a first set of traffic attributes, to a first regional CU-UP 205 and may be configured to route traffic, associated with a different network slice or a second set of traffic attributes, to a second regional CU-UP 205. Selectively routing traffic to different regional CU-UPs 205 may serve as a load balancing and/or reliability mechanism to improve the efficiency of operation of the network.

Figure 5:
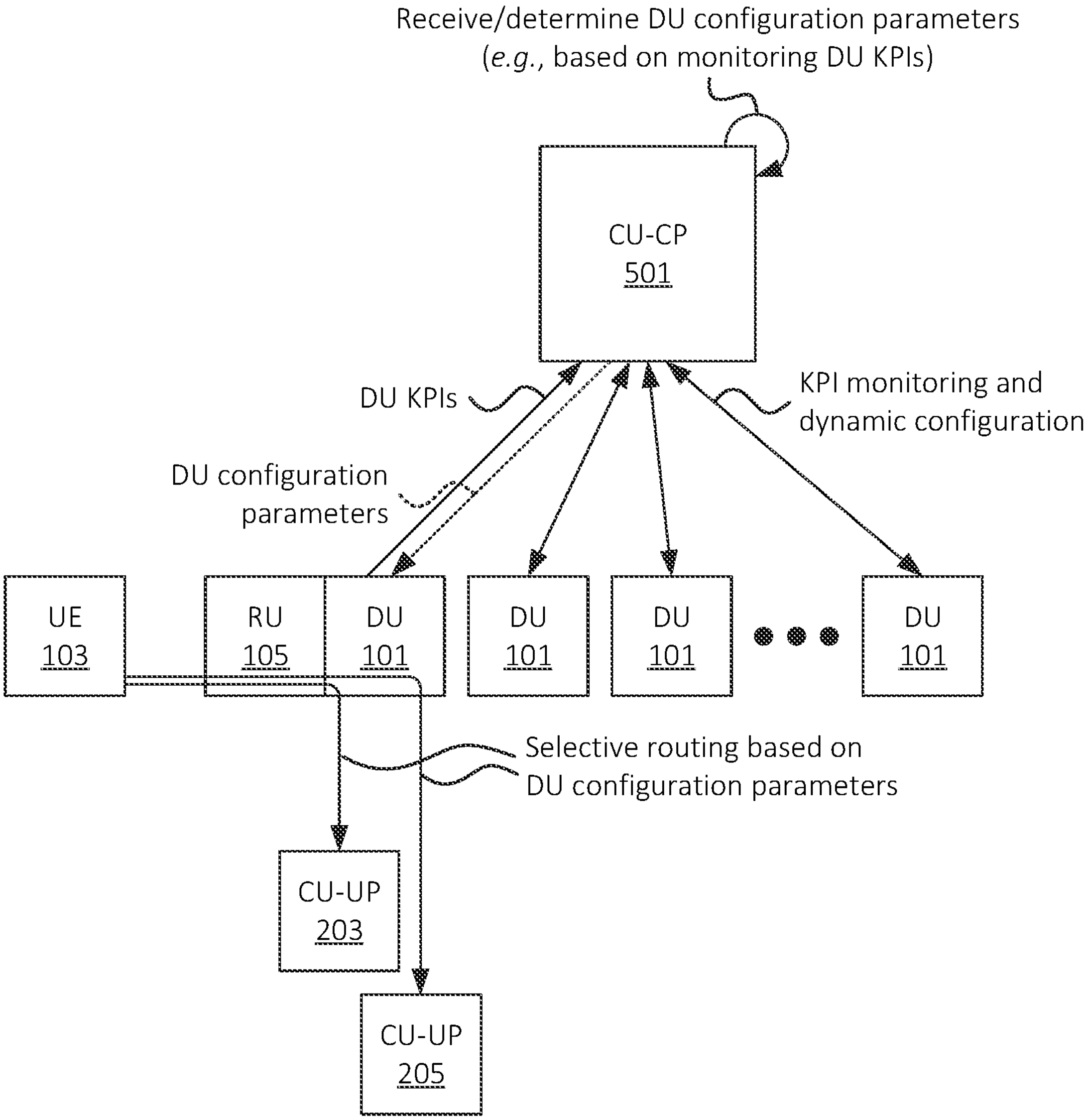
FIG. 5 illustrates the example dynamic configuration or reconfiguration of wireless network elements, in accordance with some embodiments.

As noted above, DUs 101 may be configured by a RAN controller. For example, as shown in FIG. 5, DUs 101 (which may be associated with different sites 201) may be configured by CU-CP 501. In some embodiments, CU-CP 501 may monitor or otherwise receive KPIs from some or all DUs 101 (e.g., on an ongoing basis). KPIs from a given DU 101 may include metrics such as quantity of connected UEs, quantity of active sessions, utilization of radio resources of an associated RU 105, and/or other suitable metrics or KPIs. In this manner, CU-CP 501 may receive, aggregate, etc. KPIs from multiple different DUs 101 and may adjust configuration parameters of such DUs 101 to provide particular levels of performance (e.g., in accordance with particular SLAs, QoS parameters, etc.) either on an individual basis or as a group.

For example, for a given DU 101, CU-CP 501 may adjust radio resource allocation parameters to allocate or reserve additional radio resources (e.g., Physical Resource Blocks ("PRBs")) for a particular slice, a particular UE 103, a particular service, a particular traffic type, etc. such as in situations where SLAs or QoS parameters associated with the slice, UE 103, etc. are not being met. In this sense, CU-CP 501 may perform remedial measures when determining that SLAs or QoS parameters are not being met, or when predicting that SLAs or QoS parameters may potentially not be met in the future. Similarly, for a given DU 101 or set of DUs 101, CU-CP 501 may adjust beamforming parameters, such that DUs 101 are able to focus wireless coverage on areas in which UEs 103 are present or are predicted to be present, in order to meet SLAs or QoS parameters associated with services provided to such UEs 103.

The configuration parameters provided by CU-CP 501 may also include policies, criteria, etc. based on which DUs 101 may route traffic to different CU-UPs (e.g., a particular local CU-UP 203, a regional CU-UP 205, etc.). CU-CP 501 may indicate, for example, to a particular DU 101 that traffic associated with a particular slice should be routed to local CU-UP 203, and that traffic associated with a different slice should be routed to regional CU-UP 205. In some embodiments, other traffic attributes may be provided in addition to or in lieu of a network slice with which such traffic is associated. For example, CU-CP 501 may indicate, to a particular DU 101, that traffic associated with a particular slice and a first UE 103 should be routed to local CU-UP 203, while traffic associated with the same particular slice and a second UE 103 should be routed to regional CU-UP 205. Further, CU-CP 501 may indicate to a first DU 101 that traffic associated with a particular slice should be routed to local CU-UP 203, and may indicate to a second DU 101 that traffic associated with the same slice should be routed to regional CU-UP 205.

As discussed above, CU-CP 501 may dynamically provide configuration parameters to various DUs 101. In this sense, CU-CP 501 may maintain a RAN that includes DUs 101 in a manner that satisfies SLAs, QoS parameters, or other objectives of the RAN in order to optimally provide wireless services to UEs 103 wirelessly connected to the RAN.

Figure 6:
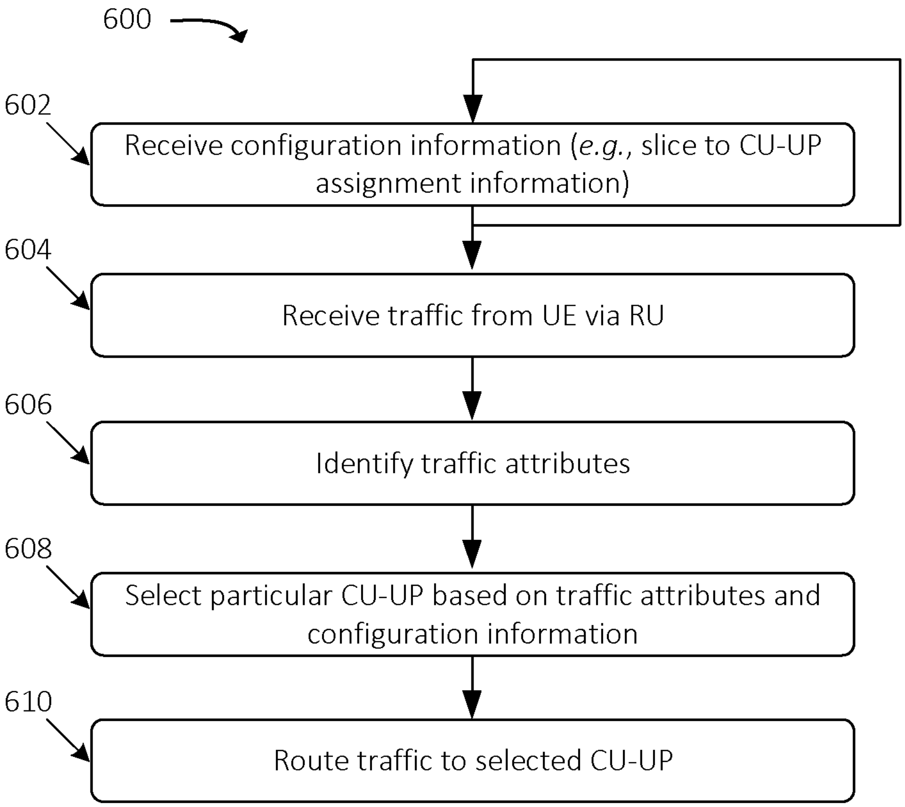
FIG. 6 illustrates an example process for selectively routing traffic within a radio access network ("RAN"), in accordance with some embodiments.

FIG. 6 illustrates an example process 600 for selectively routing traffic within a RAN. In some embodiments, some or all of process 600 may be performed by a particular DU 101.

As shown, process 600 may include receiving (at 602) configuration information, such as information assigning DU 101 to route traffic with particular attributes (e.g., a particular network slice or other suitable attributes) to one or more particular CU-UPs. As discussed above, DU 101 may receive the configuration information from CU-CP 501 or some other suitable source. DU 101 may receive the configuration information on an ongoing basis, such as based on a determination by CU-CP 501 or some other suitable device or system that the configuration information should be modified based on KPIs received from DU 101, one or more other DUs 101, and/or other suitable sources. As discussed above, the configuration information may include other configuration information in addition to information associating particular traffic attributes with particular CU-UPs, such as beamforming parameters, radio resource allocation parameters, etc.

Process 600 may further include receiving (at 604) traffic from one or more UEs 103 via a particular RU 105. For example, DU 101 may receive PHY layer traffic that is wirelessly received by RU 105, and may perform processing, aggregation, etc. to generate higher layer traffic (e.g., RLC traffic or other suitable traffic).

Process 600 may additionally include identifying (at 606) attributes of the received traffic. For example, DU 101 may identify a network slice with which the traffic is associated, may identify a particular UE 103 from which the traffic was received, and/or may identify other suitable attributes of the traffic or of UE 103 from which the traffic was received.

Process 600 may also include selecting (at 608) a particular CU-UP based on the traffic attributes and the configuration information. For example, DU 101 may identify that the configuration information (received at 602) indicates that traffic having the identified (at 606) attributes (e.g., the particular network slice or other attributes) indicates that the traffic should be forwarded to a particular CU-UP out of a set of candidate CU-UPs. On the other hand, other traffic received by DU 101 (e.g., from the same UE 103 or a different UE 103) may have other attributes, and DU 101 may identify that the other traffic should be routed to a different CU-UP (e.g., traffic associated with different network slices or different UEs 103 may be routed to different CU-UPs, as indicated in the configuration information).

Process 600 may further include routing (at 610) the traffic to the selected CU-UP. As discussed above, the selected CU-UP may be relatively proximate or local to DU 101, in order to provide low latency communications. On the other hand, the selected CU-UP may be relatively distant to DU 101 (e.g., a regional or far cloud CU-UP), in order to reduce or minimize load on the local CU-UP. As further noted above, in some embodiments, the selected CU-UP may be implemented at the same set of hardware resources (e.g., the same MEC 109) as a given user plane gateway (e.g., UPF 111, a Packet Data Network ("PDN") gateway ("PGW")) that handles higher layer routing, such as Internet Protocol ("IP")-based routing. In this manner, end-to-end latency may be extremely low for UEs that wirelessly communicate via DU 101 and an associated RU 105.

Figure 7:
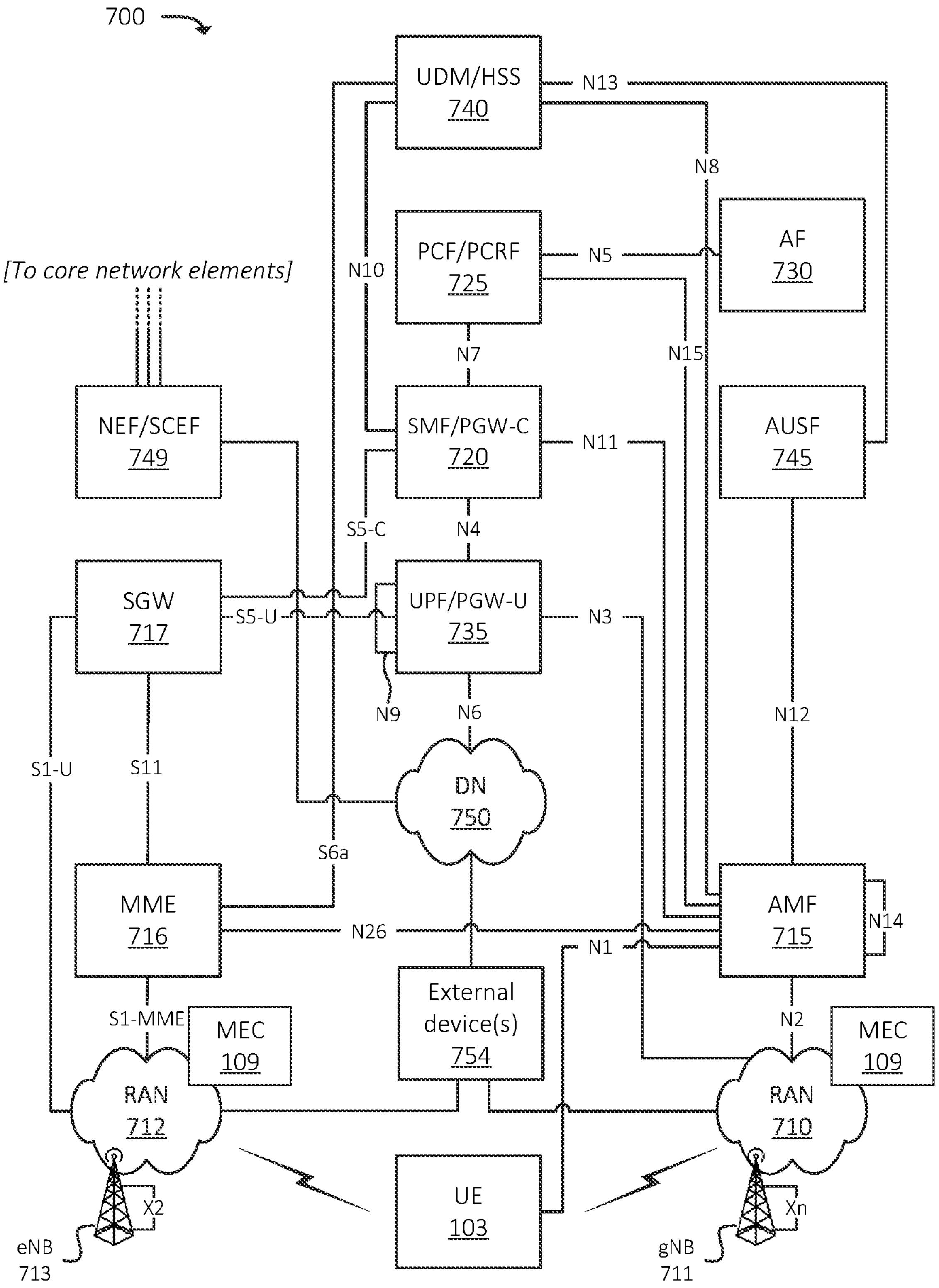
FIGS. 7 and 8 illustrate example environments in which one or more embodiments, described herein, may be implemented.

FIG. 7 illustrates an example environment 700, in which one or more embodiments may be implemented. In some embodiments, environment 700 may correspond to a Fifth Generation ("5G") network, and/or may include elements of a 5G network. In some embodiments, environment 700 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). In some embodiments, portions of environment 700 may represent or may include a 5G core ("5GC"). As shown, environment 700 may include UE 103, RAN 710 (which may include one or more Next Generation Node Bs ("gNBss") 711), RAN 712 (which may include one or more evolved Node Bs ("eNBs") 713), and various network functions such as Access and Mobility Management Function ("AMF") 715, Mobility Management Entity ("MME") 716, Serving Gateway ("SGW") 717, Session Management Function ("SMF")/PGW-Control plane function ("PGW-C") 720, Policy Control Function ("PCF")/Policy Charging and Rules Function ("PCRF") 725, Application Function ("AF") 730, User Plane Function ("UPF")/PGW-User plane function ("PGW-U") 735, Unified Data Management ("UDM")/ Home Subscriber Server ("HSS") 740, Authentication Server Function ("AUSF") 745, and Network Exposure Function ("NEF")/Service Capability Exposure Function ("SCEF") 749. Environment 700 may also include one or more networks, such as Data Network ("DN") 750. Environment 700 may include one or more additional devices or systems communicatively coupled to one or more networks (e.g., DN 750), such as one or more external devices 754.

The example shown in FIG. 7 illustrates one instance of each network component or function (e.g., one instance of SMF/PGW-C 720, PCF/PCRF 725, UPF/PGW-U 735, UDM/HSS 740, and/or AUSF 745). In practice, environment 700 may include multiple instances of such components or functions. For example, in some embodiments, environment 700 may include multiple "slices" of a core network, where each slice includes a discrete and/or logical set of network functions (e.g., one slice may include a first instance of AMF 715, SMF/PGW-C 720, PCF/PCRF 725, and/or UPF/PGW-U 735, while another slice may include a second instance of AMF 715, SMF/PGW-C 720, PCF/PCRF 725, and/or UPF/PGW-U 735). The different slices may provide differentiated levels of service, such as service in accordance with different QoS parameters.

The quantity of devices and/or networks, illustrated in FIG. 7, is provided for explanatory purposes only. In practice, environment 700 may include additional devices and/or networks, fewer devices and/or networks, different devices and/or networks, or differently arranged devices and/or networks than illustrated in FIG. 7. For example, while not shown, environment 700 may include devices that facilitate or enable communication between various components shown in environment 700, such as routers, modems, gateways, switches, hubs, etc. In some implementations, one or more devices of environment 700 may be physically integrated in, and/or may be physically attached to, one or more other devices of environment 700. Alternatively, or additionally, one or more of the devices of environment 700 may perform one or more network functions described as being performed by another one or more of the devices of environment 700.

Additionally, one or more elements of environment 700 may be implemented in a virtualized and/or containerized manner. For example, one or more of the elements of environment 700 may be implemented by one or more Virtualized Network Functions ("VNFs"), Cloud-Native Network Functions ("CNFs"), etc. In such embodiments, environment 700 may include, may implement, and/or may be communicatively coupled to an orchestration platform that provisions hardware resources, installs containers or applications, performs load balancing, and/or otherwise manages the deployment of such elements of environment 700. In some embodiments, such orchestration and/or management of such elements of environment 700 may be performed by, or in conjunction with, the open-source Kubernetes® application programming interface ("API") or some other suitable virtualization, containerization, and/or orchestration system.

Elements of environment 700 may interconnect with each other and/or other devices via wired connections, wireless connections, or a combination of wired and wireless connections. Examples of interfaces or communication pathways between the elements of environment 700, as shown in FIG. 7, may include an N1 interface, an N2 interface, an N3 interface, an N4 interface, an N5 interface, an N6 interface, an N7 interface, an N8 interface, an N9 interface, an N10 interface, an N11 interface, an N12 interface, an N13 interface, an N14 interface, an N15 interface, an N26 interface, an S1-C interface, an S1-U interface, an S5-C interface, an S5-U interface, an S6a interface, an S11 interface, and/or one or more other interfaces. Such interfaces may include interfaces not explicitly shown in FIG. 7, such as Service-Based Interfaces ("SBIs"), including an Namf interface, an Nudm interface, an Npcf interface, an Nupf interface, an Nnef interface, an Nsmf interface, and/or one or more other SBIs.

UE 103 may include a computation and communication device, such as a wireless mobile communication device that is capable of communicating with RAN 710, RAN 712, and/or DN 750. UE 103 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an Internet of Things ("IoT") device (e.g., a sensor, a smart home appliance, a wearable device, a programmable logic controller or other industrial controller, a Machine-to-Machine ("M2M") device, or the like), a Fixed Wireless Access ("FWA") device, or another type of mobile computation and communication device. UE 103 may send traffic to and/or receive traffic (e.g., user plane traffic) from DN 750 via RAN 710, RAN 712, and/or UPF/PGW-U 735.

RAN 710 may be, or may include, a 5G RAN that includes one or more base stations (e.g., one or more gNBs 711), via which UE 103 may communicate with one or more other elements of environment 700. UE 103 may communicate with RAN 710 via an air interface (e.g., as provided by gNB 711). For instance, RAN 710 may receive traffic (e.g., user plane traffic such as voice call traffic, data traffic, messaging traffic, etc.) from UE 103 via the air interface, and may communicate the traffic to UPF/PGW-U 735 and/or one or more other devices or networks. Further, RAN 710 may receive signaling traffic, control plane traffic, etc. from UE 103 via the air interface, and may communicate such signaling traffic, control plane traffic, etc. to AMF 715 and/or one or more other devices or networks. Additionally, RAN 710 may receive traffic intended for UE 103 (e.g., from UPF/PGW-U 735, AMF 715, and/or one or more other devices or networks) and may communicate the traffic to UE 103 via the air interface.

RAN 712 may be, or may include, a LTE RAN that includes one or more base stations (e.g., one or more eNBs 713), via which UE 103 may communicate with one or more other elements of environment 700. UE 103 may communicate with RAN 712 via an air interface (e.g., as provided by eNB 713). For instance, RAN 712 may receive traffic (e.g., user plane traffic such as voice call traffic, data traffic, messaging traffic, signaling traffic, etc.) from UE 103 via the air interface, and may communicate the traffic to UPF/PGW-U 735 (e.g., via SGW 717) and/or one or more other devices or networks. Further, RAN 712 may receive signaling traffic, control plane traffic, etc. from UE 103 via the air interface, and may communicate such signaling traffic, control plane traffic, etc. to MME 716 and/or one or more other devices or networks. Additionally, RAN 712 may receive traffic intended for UE 103 (e.g., from UPF/PGW-U 735, MME 716, SGW 717, and/or one or more other devices or networks) and may communicate the traffic to UE 103 via the air interface.

One or more RANs of environment 700 (e.g., RAN 710 and/or RAN 712) may include, may implement, and/or may otherwise be communicatively coupled to one or more edge computing devices, such as one or more MECs 109. MECs 109 may be co-located with wireless network infrastructure equipment of RANs 710 and/or 712 (e.g., one or more gNBs 711 and/or one or more eNBs 713, respectively). Additionally, or alternatively, MECs 109 may otherwise be associated with geographical regions (e.g., coverage areas) of wireless network infrastructure equipment of RANs 710 and/or 712. In some embodiments, one or more MECs 109 may be implemented by the same set of hardware resources, the same set of devices, etc. that implement wireless network infrastructure equipment of RANs 710 and/or 712. In some embodiments, one or more MECs 109 may be implemented by different hardware resources, a different set of devices, etc. from hardware resources or devices that implement wireless network infrastructure equipment of RANs 710 and/or 712. In some embodiments, MECs 109 may be communicatively coupled to wireless network infrastructure equipment of RANs 710 and/or 712 (e.g., via a high-speed and/or low-latency link such as a physical wired interface, a high-speed and/or low-latency wireless interface, or some other suitable communication pathway).

MECs 109 may include hardware resources (e.g., configurable or provisionable hardware resources) that may be configured to provide services and/or otherwise process traffic to and/or from UE 103, via RAN 710 and/or 712. For example, RAN 710 and/or 712 may route some traffic from UE 103 (e.g., traffic associated with one or more particular services, applications, application types, etc.) to a respective MEC 109 instead of to core network elements of environment 700 (e.g., UPF/PGW-U 735). MEC 109 may accordingly provide services to UE 103 by processing such traffic, performing one or more computations based on the received traffic, and providing traffic to UE 103 via RAN 710 and/or 712. MEC 109 may include, and/or may implement, some or all of the functionality described above with respect to UPF/PGW-U 735, AF 730, one or more application servers, and/or one or more other devices, systems, VNFs, CNFs, etc. In this manner, ultra-low latency services may be provided to UE 103, as traffic does not need to traverse links (e.g., backhaul links) between RAN 710 and/or 712 and the core network.

AMF 715 may include one or more devices, systems, VNFs, CNFs, etc., that perform operations to register UE 103 with the 5G network, to establish bearer channels associated with a session with UE 103, to hand off UE 103 from the 5G network to another network, to hand off UE 103 from the other network to the 5G network, manage mobility of UE 103 between RANs 710 and/or gNBs 711, and/or to perform other operations. In some embodiments, the 5G network may include multiple AMFs 715, which communicate with each other via the N14 interface (denoted in FIG. 7 by the line marked "N14" originating and terminating at AMF 715).

MME 716 may include one or more devices, systems, VNFs, CNFs, etc., that perform operations to register UE 103 with the EPC, to establish bearer channels associated with a session with UE 103, to hand off UE 103 from the EPC to another network, to hand off UE 103 from another network to the EPC, manage mobility of UE 103 between RANs 712 and/or eNBs 713, and/or to perform other operations.

SGW 717 may include one or more devices, systems, VNFs, CNFs, etc., that aggregate traffic received from one or more eNBs 713 and send the aggregated traffic to an external network or device via UPF/PGW-U 735. Additionally, SGW 717 may aggregate traffic received from one or more UPF/PGW-Us 735 and may send the aggregated traffic to one or more eNBs 713. SGW 717 may operate as an anchor for the user plane during inter-eNB handovers and as an anchor for mobility between different telecommunication networks or RANs (e.g., RANs 710 and 712).

SMF/PGW-C 720 may include one or more devices, systems, VNFs, CNFs, etc., that gather, process, store, and/or provide information in a manner described herein. SMF/PGW-C 720 may, for example, facilitate the establishment of communication sessions on behalf of UE 103. In some embodiments, the establishment of communications sessions may be performed in accordance with one or more policies provided by PCF/PCRF 725.

PCF/PCRF 725 may include one or more devices, systems, VNFs, CNFs, etc., that aggregate information to and from the 5G network and/or other sources. PCF/PCRF 725 may receive information regarding policies and/or subscriptions from one or more sources, such as subscriber databases and/or from one or more users (such as, for example, an administrator associated with PCF/PCRF 725).

AF 730 may include one or more devices, systems, VNFs, CNFs, etc., that receive, store, and/or provide information that may be used in determining parameters (e.g., quality of service parameters, charging parameters, or the like) for certain applications.

UPF/PGW-U 735 may include one or more devices, systems, VNFs, CNFs, etc., that receive, store, and/or provide data (e.g., user plane data). For example, UPF/PGW-U 735 may receive user plane data (e.g., voice call traffic, data traffic, etc.), destined for UE 103, from DN 750, and may forward the user plane data toward UE 103 (e.g., via RAN 710, SMF/PGW-C 720, and/or one or more other devices). In some embodiments, multiple instances of UPF/PGW-U 735 may be deployed (e.g., in different geographical locations), and the delivery of content to UE 103 may be coordinated via the N9 interface (e.g., as denoted in FIG. 7 by the line marked "N9" originating and terminating at UPF/PGW-U 735). Similarly, UPF/PGW-U 735 may receive traffic from UE 103 (e.g., via RAN 710, RAN 712, SMF/PGW-C 720, and/or one or more other devices), and may forward the traffic toward DN 750. In some embodiments, UPF/PGW-U 735 may communicate (e.g., via the N4 interface) with SMF/PGW-C 720, regarding user plane data processed by UPF/PGW-U 735.

UDM/HSS 740 and AUSF 745 may include one or more devices, systems, VNFs, CNFs, etc., that manage, update, and/or store, in one or more memory devices associated with AUSF 745 and/or UDM/HSS 740, profile information associated with a subscriber. In some embodiments, UDM/HSS 740 may include, may implement, may be communicatively coupled to, and/or may otherwise be associated with some other type of repository or database, such as a Unified Data Repository ("UDR"). AUSF 745 and/or UDM/HSS 740 may perform authentication, authorization, and/or accounting operations associated with one or more UEs 103 and/or one or more communication sessions associated with one or more UEs 103.

DN 750 may include one or more wired and/or wireless networks. For example, DN 750 may include an Internet Protocol ("IP")-based PDN, a wide area network ("WAN") such as the Internet, a private enterprise network, and/or one or more other networks. UE 103 may communicate, through DN 750, with data servers, other UEs 103, and/or to other servers or applications that are coupled to DN 750. DN 750 may be connected to one or more other networks, such as a public switched telephone network ("PSTN"), a public land mobile network ("PLMN"), and/or another network. DN 750 may be connected to one or more devices, such as content providers, applications, web servers, and/or other devices, with which UE 103 may communicate.

External devices 754 may include one or more devices or systems that communicate with UE 103 via DN 750 and one or more elements of environment 700 (e.g., via UPF/PGW-U 735). External devices 754 may include, for example, one or more application servers, content provider systems, web servers, or the like. External devices 754 may, for example, implement "server-side" applications that communicate with "client-side" applications executed by UE 103. External devices 754 may provide services to UE 103 such as gaming services, videoconferencing services, messaging services, email services, web services, and/or other types of services.

In some embodiments, external devices 754 may communicate with one or more elements of environment 700 (e.g., core network elements) via NEF/SCEF 749. NEF/SCEF 749 may include one or more devices, systems, VNFs, CNFs, etc. that provide access to information, APIs, and/or other operations or mechanisms of one or more core network elements to devices or systems that are external to the core network (e.g., to external device 754 via DN 750). NEF/SCEF 749 may maintain authorization and/or authentication information associated with such external devices or systems, such that NEF/SCEF 749 is able to provide information, that is authorized to be provided, to the external devices or systems. For example, a given external device 754 may request particular information associated with one or more core network elements. NEF/SCEF 749 may authenticate the request and/or otherwise verify that external device 754 is authorized to receive the information, and may request, obtain, or otherwise receive the information from the one or more core network elements. In some embodiments, NEF/SCEF 749 may include, may implement, may be implemented by, may be communicatively coupled to, and/or may otherwise be associated with a Security Edge Protection Proxy ("SEPP"), which may perform some or all of the functions discussed above. External device 754 may, in some situations, subscribe to particular types of requested information provided by the one or more core network elements, and the one or more core network elements may provide (e.g., "push") the requested information to NEF/SCEF 749 (e.g., in a periodic or otherwise ongoing basis).

In some embodiments, external devices 754 may communicate with one or more elements of RAN 710 and/or 712 via an API or other suitable interface. For example, a given external device 754 may provide instructions, requests, etc. to RAN 710 and/or 712 to provide one or more services via one or more respective MECs 109. In some embodiments, such instructions, requests, etc. may include QoS parameters, Service Level Agreements ("SLAs"), etc. (e.g., maximum latency thresholds, minimum throughput thresholds, etc.) associated with the services.

Figure 8:
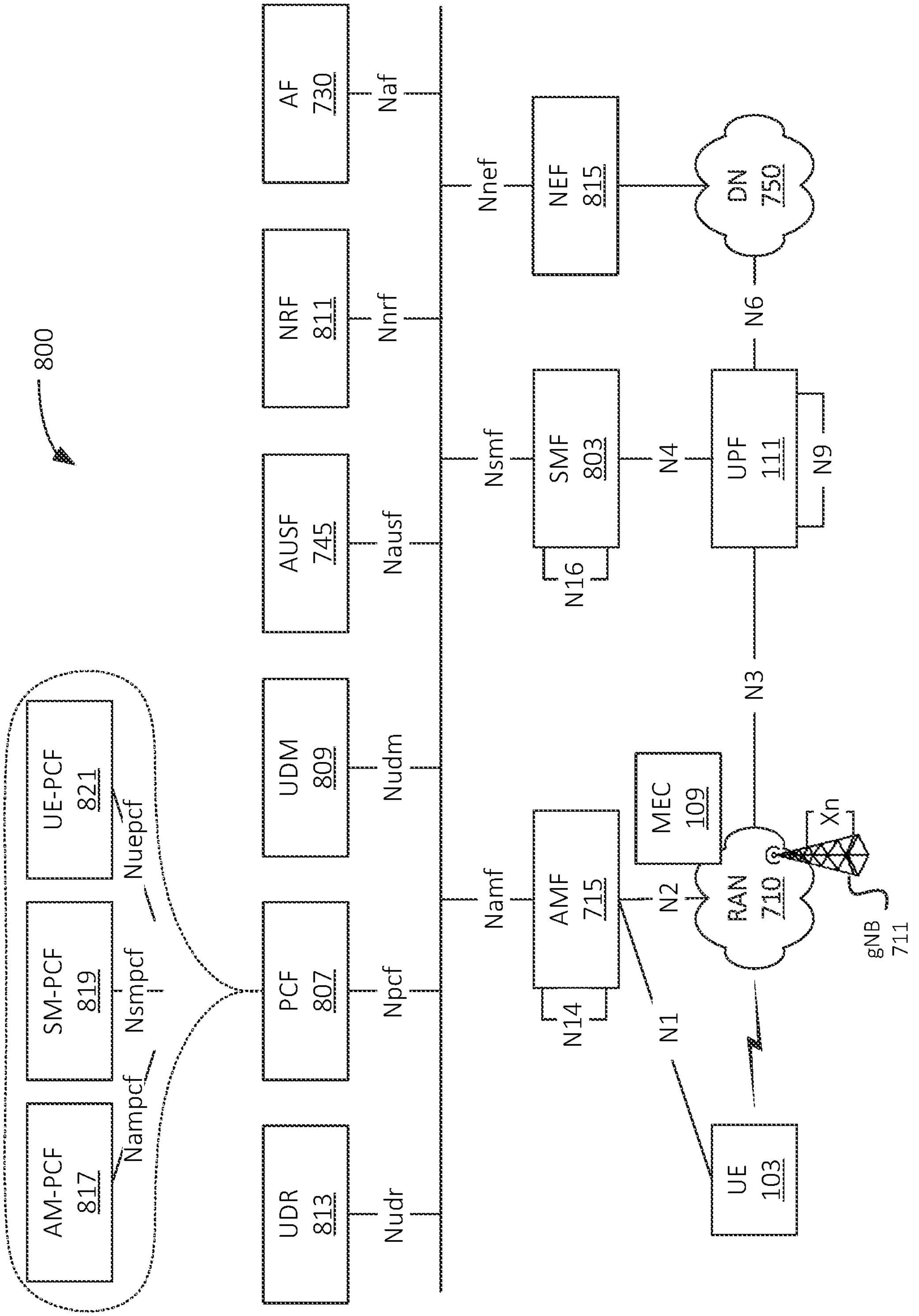

FIG. 8 illustrates another example environment 800, in which one or more embodiments may be implemented. In some embodiments, environment 800 may correspond to a 5G network, and/or may include elements of a 5G network. In some embodiments, environment 800 may correspond to a 5G SA architecture. In some embodiments, environment 800 may include a 5GC, in which 5GC network elements perform one or more operations described herein.

As shown, environment 800 may include UE 103, RAN 710 (which may include one or more gNBs 711 or other types of wireless network infrastructure) and various network functions, which may be implemented as VNFs, CNFs, etc. Such network functions may include AMF 715, SMF 803, UPF 111, PCF 807, UDM 809, AUSF 745, Network Repository Function ("NRF") 811, AF 730, UDR 813, and NEF 815. Environment 800 may also include or may be communicatively coupled to one or more networks, such as Data Network DN 750.

The example shown in FIG. 8 illustrates one instance of each network component or function (e.g., one instance of SMF 803, UPF 111, PCF 807, UDM 809, AUSF 745, etc.). In practice, environment 800 may include multiple instances of such components or functions. For example, in some embodiments, environment 800 may include multiple "slices" of a core network, where each slice includes a discrete and/or logical set of network functions (e.g., one slice may include a first instance of SMF 803, PCF 807, UPF 111, etc., while another slice may include a second instance of SMF 803, PCF 807, UPF 111, etc.). Additionally, or alternatively, one or more of the network functions of environment 800 may implement multiple network slices.

The different slices may provide differentiated levels of service, such as service in accordance with different QoS parameters.

The quantity of devices and/or networks, illustrated in FIG. 8, is provided for explanatory purposes only. In practice, environment 800 may include additional devices and/or networks, fewer devices and/or networks, different devices and/or networks, or differently arranged devices and/or networks than illustrated in FIG. 8. For example, while not shown, environment 800 may include devices that facilitate or enable communication between various components shown in environment 800, such as routers, modems, gateways, switches, hubs, etc. In some implementations, one or more devices of environment 800 may be physically integrated in, and/or may be physically attached to, one or more other devices of environment 800. Alternatively, or additionally, one or more of the devices of environment 800 may perform one or more network functions described as being performed by another one or more of the devices of environment 800.

Elements of environment 800 may interconnect with each other and/or other devices via wired connections, wireless connections, or a combination of wired and wireless connections. Examples of interfaces or communication pathways between the elements of environment 800, as shown in FIG. 8, may include interfaces shown in FIG. 8 and/or one or more interfaces not explicitly shown in FIG. 8. These interfaces may include interfaces between specific network functions, such as an N1 interface, an N2 interface, an N3 interface, an N6 interface, an N9 interface, an N14 interface, an N16 interface, and/or one or more other interfaces. In some embodiments, one or more elements of environment 800 may communicate via a service-based architecture ("SBA"), in which a routing mesh or other suitable routing mechanism may route communications to particular network functions based on interfaces or identifiers associated with such network functions. Such interfaces may include or may be referred to as SBIs, including an Namf interface (e.g., indicating communications to be routed to AMF 715), an Nudm interface (e.g., indicating communications to be routed to UDM 809), an Npcf interface, an Nupf interface, an Nnef interface, an Nsmf interface, an Nnrf interface, an Nudr interface, an Naf interface, and/or one or more other SBIs.

UPF 111 may include one or more devices, systems, VNFs, CNFs, etc., that receive, route, process, and/or forward traffic (e.g., user plane traffic). As discussed above, UPF 111 may communicate with UE 103 via one or more communication sessions, such as PDU sessions. Such PDU sessions may be associated with a particular network slice or other suitable QoS parameters, as noted above. UPF 111 may receive downlink user plane traffic (e.g., voice call traffic, data traffic, etc. destined for UE 103) from DN 750, and may forward the downlink user plane traffic toward UE 103 (e.g., via RAN 710). In some embodiments, multiple UPFs 111 may be deployed (e.g., in different geographical locations), and the delivery of content to UE 103 may be coordinated via the N9 interface. Similarly, UPF 111 may receive uplink traffic from UE 103 (e.g., via RAN 710), and may forward the traffic toward DN 750. In some embodiments, UPF 111 may implement, may be implemented by, may be communicatively coupled to, and/or may otherwise be associated with UPF/PGW-U 735. In some embodiments, UPF 111 may communicate (e.g., via the N4 interface) with SMF 803, regarding user plane data processed by UPF 111 (e.g., to provide analytics or reporting information, to receive policy and/or authorization information, etc.).

PCF 807 may include one or more devices, systems, VNFs, CNFs, etc., that aggregate, derive, generate, etc. policy information associated with the 5GC and/or UEs 103 that communicate via the 5GC and/or RAN 710. PCF 807 may receive information regarding policies and/or subscriptions from one or more sources, such as subscriber databases (e.g., UDM 809, UDR 813, etc.), and/or from one or more users such as, for example, an administrator associated with PCF 807. In some embodiments, the functionality of PCF 807 may be split into multiple network functions or subsystems, such as access and mobility PCF ("AM-PCF") 817, session management PCF ("SM-PCF") 819, UE PCF ("UE-PCF") 821, and so on. Such different "split" PCFs may be associated with respective SBIs (e.g., AM-PCF 817 may be associated with an Nampcf SBI, SM-PCF 819 may be associated with an Nsmpcf SBI, UE-PCF 821 may be associated with an Nuepcf SBI, and so on) via which other network functions may communicate with the split PCFs. The split PCFs may maintain information regarding policies associated with different devices, systems, and/or network functions.

NRF 811 may include one or more devices, systems, VNFs, CNFs, etc. that maintain routing and/or network topology information associated with the 5GC. For example, NRF 811 may maintain and/or provide IP addresses of one or more network functions, routes associated with one or more network functions, discovery and/or mapping information associated with particular network functions or network function instances (e.g., whereby such discovery and/or mapping information may facilitate the SBA), and/or other suitable information.

UDR 813 may include one or more devices, systems, VNFs, CNFs, etc. that provide user and/or subscriber information, based on which PCF 807 and/or other elements of environment 800 may determine access policies, QoS policies, charging policies, or the like. In some embodiments, UDR 813 may receive such information from UDM 809 and/or one or more other sources.

NEF 815 may include one or more devices, systems, VNFs, CNFs, etc. that provide access to information, APIs, and/or other operations or mechanisms of the 5GC to devices or systems that are external to the 5GC. NEF 815 may maintain authorization and/or authentication information associated with such external devices or systems, such that NEF 815 is able to provide information, that is authorized to be provided, to the external devices or systems. Such information may be received from other network functions of the 5GC (e.g., as authorized by an administrator or other suitable entity associated with the 5GC), such as SMF 803, UPF 111, a charging function ("CHF") of the 5GC, and/or other suitable network function. NEF 815 may communicate with external devices or systems (e.g., external devices 754) via DN 750 and/or other suitable communication pathways.

While environment 800 is described in the context of a 5GC, as noted above, environment 800 may, in some embodiments, include or implement one or more other types of core networks. For example, in some embodiments, environment 800 may be or may include a converged packet core, in which one or more elements may perform some or all of the functionality of one or more 5GC network functions and/or one or more EPC network functions. For example, in some embodiments, AMF 715 may include, may implement, may be implemented by, and/or may otherwise be associated with MME 716; SMF 803 may include, may implement, may be implemented by, and/or may otherwise be associated with SGW 717; PCF 807 may include, may implement, may be implemented by, and/or may otherwise be associated with a PCRF (e.g., PCF/PCRF 725); NEF 815 may include, may implement, may be implemented by, and/or may otherwise be associated with a SCEF (e.g., NEF/SCEF 749); and so on.

Figure 9:
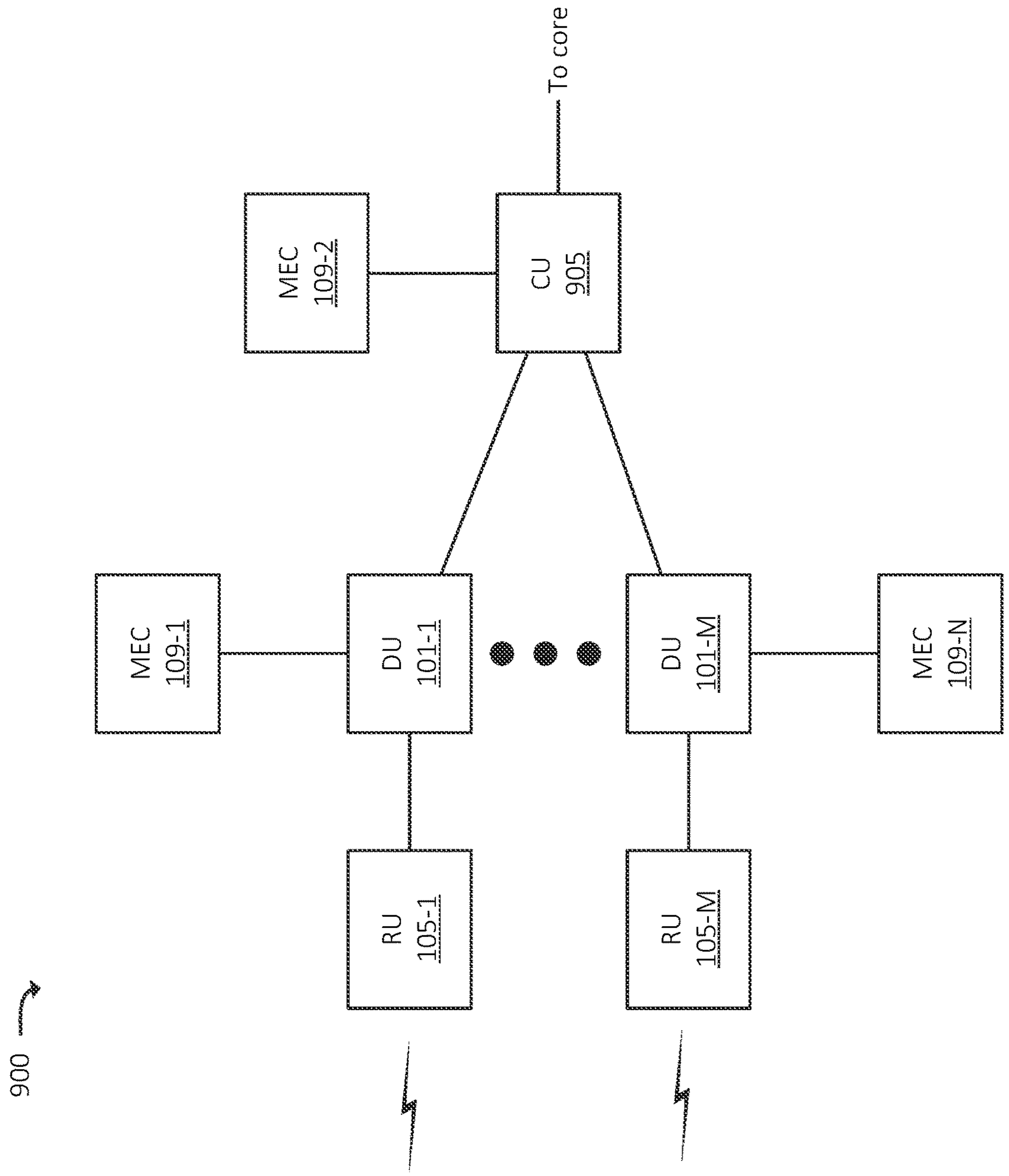
FIG. 9 illustrates an example arrangement of a RAN, in accordance with some embodiments.

FIG. 9 illustrates an example RAN environment 900, which may be included in and/or implemented by one or more RANs (e.g., RAN 710 or some other RAN). In some embodiments, a particular RAN 710 may include one RAN environment 900. In some embodiments, a particular RAN 710 may include multiple RAN environments 900. In some embodiments, RAN environment 900 may correspond to a particular gNB 711 of RAN 710. In some embodiments, RAN environment 900 may correspond to multiple gNBs 711. In some embodiments, RAN environment 900 may correspond to one or more other types of base stations of one or more other types of RANs. As shown, RAN environment 900 may include CU 905, one or more DUs 101-1 through 101-M, and one or more RUs 105-1 through 105-M.

CU 905 may communicate with a core of a wireless network (e.g., may communicate with one or more of the devices or systems described above with respect to FIG. 8, such as AMF 715 and/or UPF 111) and/or one or more other devices or systems, such as one or more MECs 109 (e.g., respective UPFs 111 that are implemented by such MECs 109). In the uplink direction (e.g., for traffic from UEs 103 to a core network), CU 905 may aggregate traffic from DUs 101, and forward the aggregated traffic to the core network and/or one or more other devices or systems, such as one or more MECs 109. In some embodiments, CU 905 may receive traffic according to a given protocol (e.g., RLC traffic) from DUs 101, and may perform higher-layer processing (e.g., may aggregate/process RLC packets and generate PDCP packets based on the RLC packets) on the traffic received from DUs 101.

CU 905 may receive downlink traffic (e.g., traffic from the core network or from another device or system such as MEC 109) for a particular UE 103, and may determine which DU(s) 101 should receive the downlink traffic. DU 101 may include one or more devices that transmit traffic between a core network (e.g., via CU 905) and UE 103 (e.g., via a respective RU 105). DU 101 may, for example, receive traffic from RU 105 at a first layer (e.g., PHY layer traffic or lower PHY layer traffic), and may process/aggregate the traffic to a second layer (e.g., upper PHY and/or RLC). DU 101 may receive traffic from CU 905 at the second layer, may process the traffic to the first layer, and provide the processed traffic to a respective RU 105 for transmission to UE 103.

CU 905, as shown in FIG. 9, may refer to CU-UP (e.g., CU-UP 203, 205, or 301), CU-CPs (e.g., CU-CP 501), or a combination thereof. Further, while FIG. 9 shows DUs 101 connected to a single CU 905 for illustrative purposes, DUs 101 may be communicatively coupled to multiple CUs (e.g., multiple CU-UPs and one or more CU-CPs), as discussed above. As further noted above, some of the functionality of CU 905 may be implemented by one or more MECs 109 (e.g., MECs 109-1 and 109-N, which are communicatively coupled to DUs 101-1 and 101-M, respectively).

RU 105 may include hardware circuitry (e.g., one or more RF transceivers, antennas, radios, and/or other suitable hardware) to communicate wirelessly (e.g., via an RF interface) with one or more UEs 103, one or more other DUs 101 (e.g., via RUs 105 associated with DUs 101), and/or any other suitable type of device. In the uplink direction, RU 105 may receive traffic from UE 103 and/or another DU 101 via the RF interface and may provide the traffic to DU 101. In the downlink direction, RU 105 may receive traffic from DU 101, and may provide the traffic to UE 103 and/or another DU 101.

One or more elements of RAN environment 900 may, in some embodiments, be communicatively coupled to one or more MECs 109. For example, DU 101-1 may be communicatively coupled to MEC 109-1, DU 101-M may be communicatively coupled to MEC 109-N, CU 905 may be communicatively coupled to MEC 109-2, and so on. MECs 109 may include hardware resources (e.g., configurable or provisionable hardware resources) that may be configured to provide services and/or otherwise process traffic to and/or from UE 103, via a respective RU 105.

For example, DU 101-1 may route some traffic, from UE 103, to MEC 109-1 instead of to a core network via CU 905. MEC 109-1 may process the traffic, perform one or more computations based on the received traffic, and may provide traffic to UE 103 via RU 105-1. As discussed above, MEC 109 may include, and/or may implement, some or all of the functionality described above with respect to UPF 111, AF 730, a CU-UP, and/or one or more other devices, systems, VNFs, CNFs, etc. In this manner, ultra-low latency services may be provided to UE 103, as traffic does not need to traverse DU 101, CU 905, links between DU 101 and CU 905, and an intervening backhaul network between RAN environment 900 and the core network. Additionally, as discussed above, DUs 101 may selectively route traffic to different CUs 905 based on network slice and/or other traffic attributes.

Figure 10:
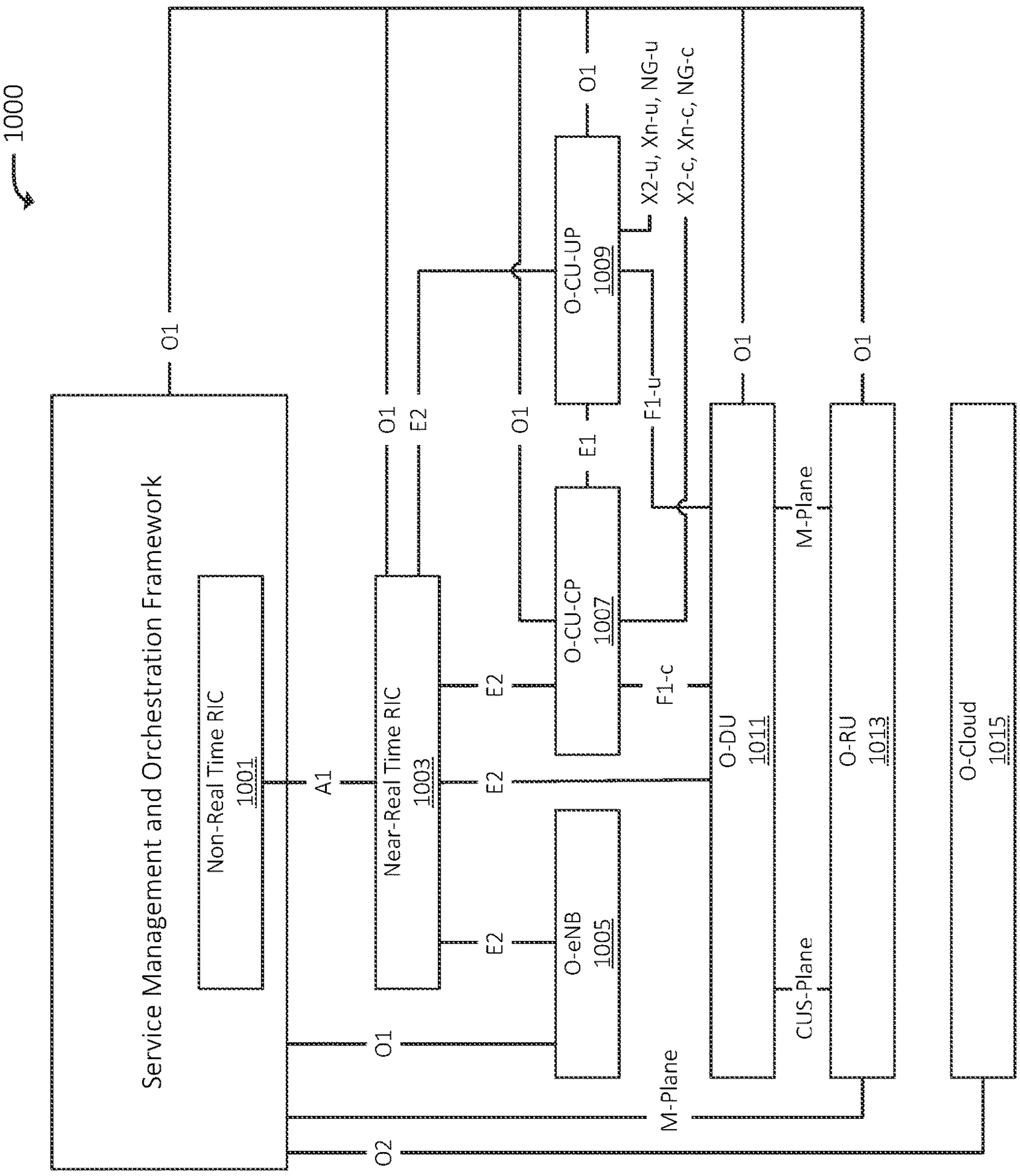
FIG. 10 illustrates an example arrangement of an Open RAN ("O-RAN") environment in which one or more embodiments, described herein, may be implemented.

FIG. 10 illustrates an example O-RAN environment 1000, which may correspond to RAN 710, RAN 712, and/or RAN environment 900. For example, RAN 710, RAN 712, and/or RAN environment 900 may include one or more instances of O-RAN environment 1000, and/or one or more instances of O-RAN environment 1000 may implement RAN 710, RAN 712, RAN environment 900, and/or some portion thereof. As shown, O-RAN environment 1000 may include Non-Real Time Radio Intelligent Controller ("RIC") 1001, Near-Real Time RIC 1003, O-eNB 1005, O-CU-CP 1007, O-CU-UP 1009, O-DU 1011, O-RU 1013, and O-Cloud 1015. O-CU-CP may implement or represent a particular CU-CP (e.g., CU-CP 501), O-CU-UP may implement or represent a particular CU-UP (e.g., CU-UP 203, 205, or 301), and O-DU may implement or represent a particular DU 101. In some embodiments, O-RAN environment 1000 may include additional, fewer, different, and/or differently arranged components or interfaces.

In some embodiments, some or all of the elements of O-RAN environment 1000 may be implemented by one or more configurable or provisionable resources, such as virtual machines, cloud computing systems, physical servers, and/or other types of configurable or provisionable resources. In some embodiments, some or all of O-RAN environment 1000 may be implemented by, and/or communicatively coupled to, one or more MECs 109.

Non-Real Time RIC 1001 and Near-Real Time RIC 1003 may receive performance information (and/or other types of information) from one or more sources, and may configure other elements of O-RAN environment 1000 based on such performance or other information. For example, Near-Real Time RIC 1003 may receive performance information, via one or more E2 interfaces, from O-eNB 1005, O-CU-CP 1007, and/or O-CU-UP 1009, and may modify parameters associated with O-eNB 1005, O-CU-CP 1007, and/or O-CU-UP 1009 based on such performance information. As discussed above, such parameters may include routing parameters and/or assignments between various O-DUs (e.g., DUs 101) and O-CU-UPs (e.g., CU-UPs 203, 205, and 301).

Similarly, Non-Real Time RIC 1001 may receive performance information associated with O-eNB 1005, O-CU-CP 1007, O-CU-UP 1009, and/or one or more other elements of O-RAN environment 1000 and may utilize machine learning and/or other higher level computing or processing to determine modifications to the configuration of O-eNB 1005, O-CU-CP 1007, O-CU-UP 1009, and/or other elements of O-RAN environment 1000. In some embodiments, Non-Real Time RIC 1001 may generate machine learning models based on performance information associated with O-RAN environment 1000 or other sources, and may provide such models to Near-Real Time RIC 1003 for implementation.

O-eNB 1005 may perform functions similar to those described above with respect to gNB 711 and/or eNB 713. For example, O-eNB 1005 may facilitate wireless communications between UE 103 and a core network. O-CU-CP 1007 may perform control plane signaling to coordinate the aggregation and/or distribution of traffic via one or more DUs 101, which may include and/or be implemented by one or more O-DUs 1011, and O-CU-UP 1009 may perform the aggregation and/or distribution of traffic via such DUs 101 (e.g., O-DUs 1011). O-DU 1011 may be communicatively coupled to one or more RUs 105, which may include and/or may be implemented by one or more O-RUs 1013. In some embodiments, O-Cloud 1015 may include or be implemented by one or more MECs 109, which may provide services, and may be communicatively coupled, to O-CU-CP 1007, O-CU-UP 1009, O-DU 1011, and/or O-RU 1013 (e.g., via an O1 and/or O2 interface).

Figure 11:
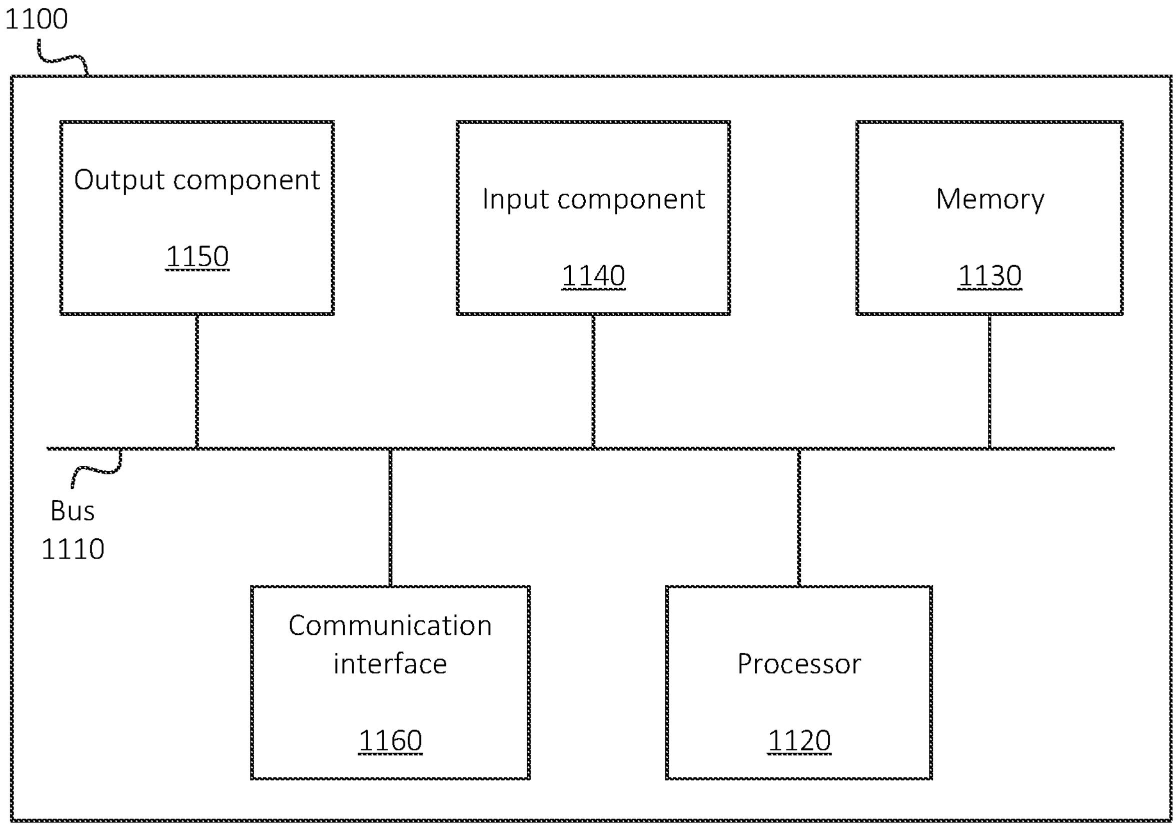
FIG. 11 illustrates example components of one or more devices, in accordance with one or more embodiments described herein.

FIG. 11 illustrates example components of device 1100. One or more of the devices described above may include one or more devices 1100. Device 1100 may include bus 1110, processor 1120, memory 1130, input component 1140, output component 1150, and communication interface 1160. In another implementation, device 1100 may include additional, fewer, different, or differently arranged components.

Bus 1110 may include one or more communication paths that permit communication among the components of device 1100. Processor 1120 may include a processor, microprocessor, a set of provisioned hardware resources of a cloud computing system, or other suitable type of hardware that interprets and/or executes instructions (e.g., processor-executable instructions). In some embodiments, processor 1120 may be or may include one or more hardware processors. Memory 1130 may include any type of dynamic storage device that may store information and instructions for execution by processor 1120, and/or any type of non-volatile storage device that may store information for use by processor 1120.

Input component 1140 may include a mechanism that permits an operator to input information to device 1100 and/or otherwise receives or detects input from a source external to input component 1140, such as a touchpad, a touchscreen, a keyboard, a keypad, a button, a switch, a microphone or other audio input component, etc. In some embodiments, input component 1140 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 1150 may include a mechanism that outputs information to the operator, such as a display, a speaker, one or more light emitting diodes ("LEDs"), etc.

Communication interface 1160 may include any transceiver-like mechanism that enables device 1100 to communicate with other devices and/or systems (e.g., via RAN 710, RAN 712, DN 750, etc.). For example, communication interface 1160 may include an Ethernet interface, an optical interface, a coaxial interface, or the like. Communication interface 1160 may include a wireless communication device, such as an infrared ("IR") receiver, a Bluetooth® radio, or the like. The wireless communication device may be coupled to an external device, such as a cellular radio, a remote control, a wireless keyboard, a mobile telephone, etc. In some embodiments, device 1100 may include more than one communication interface 1160. For instance, device 1100 may include an optical interface, a wireless interface, an Ethernet interface, and/or one or more other interfaces.

Device 1100 may perform certain operations relating to one or more processes described above. Device 1100 may perform these operations in response to processor 1120 executing instructions, such as software instructions, processor-executable instructions, etc. stored in a computer-readable medium, such as memory 1130. A computer-readable medium may be defined as a non-transitory memory device. A memory device may include space within a single physical memory device or spread across multiple physical memory devices. The instructions may be read into memory 1130 from another computer-readable medium or from another device. The instructions stored in memory 1130 may be processor-executable instructions that cause processor 1120 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-6), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:

one or more processors configured to:

receive a set of Key Performance Indicators ("KPIs") associated with a particular Distributed Unit ("DU") of a wireless network;

determine, based on the received set of KPIs, a particular set of Central Unit ("CU") routing parameters, wherein the particular set of CU routing parameters includes:

an association between a first set of traffic attributes and a first CU of the wireless network, and an association between a second set of traffic attributes and a second CU of the wireless network; and output the particular set of CU routing parameters to the particular DU, wherein the particular DU:

receives traffic from one or more User Equipment ("UEs") via one or more radio units ("RUs") associated with the particular DU, wherein the traffic received from the one or more UEs includes first traffic associated with the first set of traffic attributes and second traffic associated with the second set of traffic attributes; and routes, based on the particular set of CU routing parameters and further based on the first and second sets of traffic attributes respectively associated with the first and second traffic, the first traffic to the first CU and the second traffic to the second CU, wherein the first and second CUs each aggregate received traffic and route the aggregated traffic to a user plane gateway.

2. The device of claim 1, wherein the first CU includes a first CU-User Plane ("CU-UP"), and wherein the second CU includes a second CU-UP.

3. The device of claim 2, wherein the first CU-UP is implemented by a same set of hardware resources on which the user plane gateway is implemented, and wherein the second CU-UP is implemented by a different set of hardware resources.

4. The device of claim 3, wherein the set of hardware resources on which the first CU-UP and the user plane gateway are implemented include a Multi-Access/Mobile Edge Computing ("MEC") device.

5. The device of claim 2, wherein the one or more processors are further configured to:

receive configuration information from a CU-Control Plane ("CU-CP") of a radio access network ("RAN") that includes the first and second CUs-UPs, wherein selecting the first CU is based on the received configuration information.

6. The device of claim 1, wherein routing the first traffic to the first CU includes routing the first traffic via a first layer, wherein the first CU aggregates the first traffic via the first layer, and wherein the aggregated first traffic is routed to the user plane gateway via a second layer.

7. The device of claim 1, wherein the set of KPIs is a first set of KPIs, wherein the particular set of CU routing parameters is a first set of CU routing parameters, wherein the one or more processors are further configured to:

receive a second set of KPIs associated with the particular DU;

determine, based on the second set of KPIs, a second set of CU routing parameters, wherein the second set of CU routing parameters includes an association between the first set of traffic attributes and at least one of the second CU or a third CU of the wireless network; and output the second set of CU routing parameters to the DU, wherein the DU implements the second set of CU routing parameters in lieu of the first set of routing parameters.

8. A non-transitory computer-readable medium, storing a plurality of processor-executable instructions to:

receive a set of Key Performance Indicators ("KPIs") associated with a particular Distributed Unit ("DU") of a wireless network;

determine, based on the received set of KPIs, a particular set of Central Unit ("CU") routing parameters, wherein the particular set of CU routing parameters includes:

an association between a first set of traffic attributes and a first CU of the first traffic; wireless network, and an association between a second set of traffic attributes and a second CU of the wireless network; and output the particular set of CU routing parameters to the particular DU, wherein the particular DU:

receives traffic from one or more User Equipment ("UEs") via one or more radio units ("RUs") associated with the particular DU, wherein the traffic received from the one or more UEs includes first traffic associated with the first set of traffic attributes and second traffic associated with the second set of traffic attributes; and routes, based on the particular set of CU routing parameters and further based on the first and second sets of traffic attributes respectively associated with the first and second traffic, the first traffic to the first CU and the second traffic to the second CU, wherein the first and second CUs each aggregate received traffic and route the aggregated traffic to a user plane gateway.

9. The non-transitory computer-readable medium of claim 8, wherein the first CU includes a first CU-User Plane ("CU-UP"), and wherein the second CU includes a second CU-UP.

10. The non-transitory computer-readable medium of claim 9, wherein the first CU-UP is implemented by a same set of hardware resources on which the user plane gateway is implemented, and wherein the second CU-UP is implemented by a different set of hardware resources.

11. The non-transitory computer-readable medium of claim 10, wherein the set of hardware resources on which the first CU-UP and the user plane gateway are implemented include a Multi-Access/Mobile Edge Computing ("MEC") device.

12. The non-transitory computer-readable medium of claim 9, wherein the plurality of processor-executable instructions further include processor-executable instructions to:

receive configuration information from a CU-Control Plane ("CU-CP") of a radio access network ("RAN") that includes the first and second CU-UPs, wherein selecting the first CU is based on the received configuration information.

13. The non-transitory computer-readable medium of claim 8, wherein routing the first traffic to the first CU includes routing the first traffic via a first layer, wherein the first CU aggregates the first traffic via the first layer, and wherein the aggregated first traffic is routed to the user plane gateway via a second layer.

14. A method, comprising:

receiving a set of Key Performance Indicators ("KPIs") associated with a particular Distributed Unit ("DU") of a wireless network;

determining, based on the received set of KPIs, a particular set of Central Unit ("CU") routing parameters, wherein the particular set of CU routing parameters includes:

an association between a first set of traffic attributes and a first CU of the wireless network, and an association between a second set of traffic attributes and a second CU of the wireless network; and outputting the particular set of CU routing parameters to the particular DU, wherein the particular DU:

receives traffic from one or more User Equipment ("UEs") via one or more radio units ("RUs") associated with the particular DU, wherein the traffic received from the one or more UEs includes first traffic associated with the first set of traffic attributes and second traffic associated with the second set of traffic attributes; and routes, based on the particular set of CU routing parameters and further based on the first and second sets of traffic attributes respectively associated with the first and second traffic, the first traffic to the first CU and the second traffic to the second CU, wherein the first and second CUs each aggregate received traffic and route the aggregated traffic to a user plane gateway.

15. The method of claim 14, wherein the user plane gateway includes at least one of:

a User Plane Function ("UPF"), or a Packet Data Network gateway ("PGW").

16. The method of claim 14, wherein the first CU includes a first CU-User Plane ("CU-UP"), and wherein the second CU includes a second CU-UP.

17. The method of claim 16, wherein the first CU-UP and the user plane gateway are implemented by a particular Multi-Access/Mobile Edge Computing ("MEC") device, and wherein the second CU-UP is implemented by a different set of hardware resources than the particular MEC device.

18. The method of claim 16, further comprising:

receiving configuration information from a CU-Control Plane ("CU-CP") of a radio access network ("RAN") that includes the first and second CU-UPs, wherein selecting the first CU is based on the received configuration information.

19. The method of claim 14, wherein routing the first traffic to the first CU includes routing the first traffic via a first layer, wherein the first CU aggregates the first traffic via the first layer, and wherein the aggregated first traffic is routed to the user plane gateway via a second layer.

20. The method of claim 14, wherein the set of KPIs is a first set of KPIs, wherein the particular set of CU routing parameters is a first set of CU routing parameters, wherein the method further comprises:

receiving a second set of KPIs associated with the particular DU;

determining, based on the second set of KPIs, a second set of CU routing parameters, wherein the second set of CU routing parameters includes an association between the first set of traffic attributes and at least one of the second CU or a third CU of the wireless network; and outputting the second set of CU routing parameters to the DU, wherein the DU implements the second set of CU routing parameters in lieu of the first set of routing parameters.

* * * * *